W. H. SWAINSTON.
SAW SET.
APPLICATION FILED APR. 7, 1913.
1,088,941.
Patented Mar. 3, 1914.
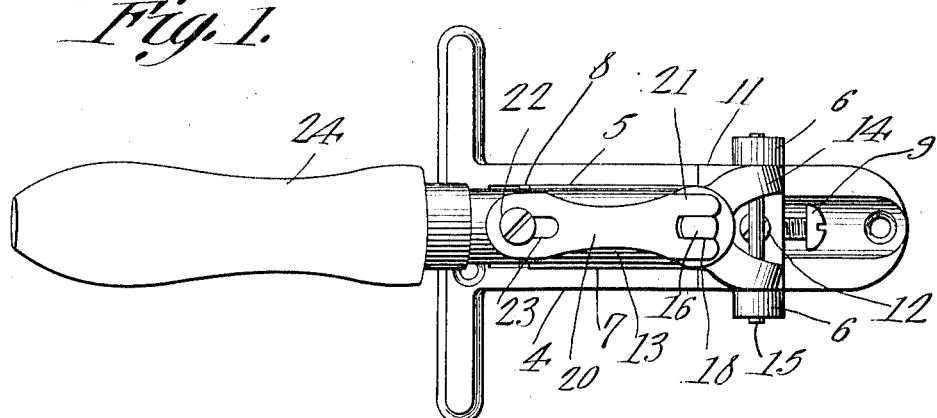
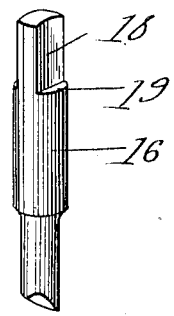
William H. Swainston, Inventor

UNITED STATES PATENT OFFICE.

WILLIAM H. SWAINSTON, OF WOODLAWN, MICHIGAN.

SAW-SET.

1,088,941. Specification of Letters Patent. Patented Mar. 3, 1914.

Application filed April 7, 1913. Serial No. 759,568.

*To all whom it may concern:*

Be it known that I, WILLIAM H. SWAINSTON, a citizen of the United States, residing at Woodlawn, in the county of Delta and State of Michigan, have invented a new and useful Saw-Set, of which the following is a specification.

The present invention appertains to saw sets, and is particularly an improvement over the saw set disclosed in my former Patent Number 955,999, issued April 26, 1910.

It is the object of the present invention to provide a comparatively simple, compact and inexpensive device of the character indicated, which may be employed in a facile and expeditious manner for setting the teeth of various saws in an efficient manner, and one which may be adjusted to be adapted to the various conditions and circumstances.

As a more specific object, the present invention aims to provide a saw set embodying an anvil and a lever pivoted to swing to and from the anvil and carrying a yielding plunger, so that when the saw is placed on the anvil, the lever may be swung so as to bring the plunger into coöperation with the proper tooth of the saw, so that the plunger may be given a blow by a sledge, hammer or other implement so as to set the tooth on the anvil.

In connection with the foregoing object, it is the object of the present invention to provide means carried by the lever for engaging a saw placed on the anvil so as to maintain the saw in position when the plunger is swung into coöperation with the proper tooth, so that the saw may not slip out of position on the anvil and in order that when the plunger is given a blow by a suitable implement, the tooth will be properly set.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The preferred embodiment of the invention has been illustrated in the accompanying drawing, wherein:—

Figure 1 is a plan view of the device. Fig. 2 is a longitudinal vertical section thereof. Fig. 3 is a perspective view of the plunger.

In carrying out the invention, reference being had in detail to the drawing, there is provided a base 4 preferably constituting a casting, and embodying a channel 5 provided with a pair of upstanding ears 6 at its rear end. The base 4 is provided with any suitable means for securing it on a table, bench or other object, as will be apparent.

Within the channel 5 there is disposed the elongated anvil 7 which is provided with the upper bevels 8 at its ends. The anvil 7 is slidable longitudinally within the channel 5, and is maintained at any adjusted position by means of a pair of set screws or jam bolts 9 threaded through the ends of the channel 5 and engaging the ends of the anvil 7. The ends of the anvil are provided with the bevels 10 with which the inner ends of the jam bolts 9 engage so that when the jam bolts are screwed inwardly they will not only maintain the anvil in position but will tend to lock it against the bottom of the channel. It will be evident that by unscrewing one of the jam bolts 9 and by screwing the other farther inward, the anvil may be slid to the proper position desired.

A plate 11 has one edge overlapping the respective bevel 8 and is secured on the rear end wall of the channel 5 by means of a screw 12, the plate 11 fitting between the ears. This plate 11 forms a stop against which the teeth of the saw may be placed when the saw is positioned on the anvil 7, so that the teeth may be properly limited on the bevel 8. It is to be noted that as the anvil is slid back and forth, the respective bevel 8 may be exposed more or less to accommodate the particular teeth of the saw. When the screw 12 is tightened, the plate 11 will be clamped on the respective bevel 8.

A lever 13 is fulcrumed to the base 4, the lever having the fork 14 fitting between the ears 6 of the base, with a pivot pin 15 passed through the ears 6 and the arms of the fork 14. The free end of the lever 13 extends forwardly or above the anvil, and a plunger 16 is slidable through a vertical bore 17 provided in the lever 13 adjoining its fulcrum. The lower end of the bore 17 is contracted, as is also the lower end of the plunger 16, so that the plunger may be limited in its downward movement. The lower end of the plunger is formed into a die which is adapted to coöperate with the respective bevel 8 when the lever is depressed or swung downwardly. The upper end of the plunger 16 has its sides flattened, as at 18, to provide the upwardly facing shoulders 19, and a leaf spring 20 is carried by the lever 13 and has its free end bifurcated or forked, as at 21, so as to straddle the flattened sides 18 and seat on the shoulders 19 to press the plunger downwardly. The leaf spring 20 is adjustable longitudinally, a screw 22 being passed through the elongated slot 23 provided in the butt end of the spring, so that when the screw is loosened, the spring 20 may be slid forwardly so as to disengage the plunger. When the spring is slid rearwardly, the bifurcation or fork 21 is adapted to engage the upper end of the plunger in such a manner as to constrain the plunger against rotation, and to also spring press the plunger downwardly.

A handle 24 is provided for the lever, the same having a threaded shank or stem 25 engaging the lever proper. The lever 13 is also provided with a depending boss 26 in advance of the plunger 16, and a clamping head 27 is provided with a threaded shank or stem 28 taking into the boss 26. The head 27 is provided with a roughened or toothed face 29 for engaging the saw, and a lock or binding nut 30 is threaded on the shank or stem 28 to bear against the boss 26 so as to lock the head 27 in any adjusted position.

In use, it is evident that the anvil 7 may be reversed so as to bring either of the bevels 8 into operation, the bevels being preferably of different pitches in order that the saw teeth may be differently set. The anvil may also be adjusted longitudinally so as to properly expose the respective bevel 8 beyond the edge of the plate 11. The plate or stop 11 may be conveniently provided with a pointer or index for facilitating the positioning of the particular tooth to be set so that when the lever is swung downwardly, the die of the plunger 16 will engage the tooth to be set. The head 27 may also be adjusted according to the thickness of the saw, as will be apparent. Then, by placing the saw on the anvil 7, with the teeth against the plate or stop 11, the lever 13 may be depressed so that the die end of the plunger 16 will engage the tooth to be set, and so that the toothed face 29 of the head 27 will engage the upper side or face of the saw so as to maintain the saw in position. When the lever has thus been depressed, the plunger 16 in engaging the tooth may yield upwardly relative to the lever, as the lever is depressed further to permit the head 27 to engage the saw. The saw is thus maintained against displacement, while the plunger 16 is yieldably held in engagement with the tooth to be set, and then by striking the upper end of the plunger 16 with a hammer, or other suitable implement, the impact or blow will cause the tooth to be set or bent against the bevel 8. The lever may then be raised so as to liberate the saw and the saw may be set to a new position, so as to set the next or succeeding tooth. By repeating this operation, the respective teeth of the saw may be properly set with ease and despatch.

If desired, a number of plungers 16 may be provided, the same being interchangeable by sliding the spring 20 forwardly, so that various forms of dies may be brought into coöperation with the anvil for setting the teeth of various saws. The device is otherwise adjustable to accommodate the various saws, as will be apparent from the foregoing.

Having thus described the invention, what is claimed as new is:—

1. In a saw set, an anvil, a lever swingable to and from the anvil, a plunger slidable through the lever to coöperate with the anvil and having flattened sides forming shoulders, and a leaf spring adjustable longitudinally on the lever and having its free end bifurcated and straddling the said flattened sides of the plunger to bear against the said shoulders so as to depress the plunger.

2. In a saw set, a base, an anvil adjustable longitudinally thereon and having a bevel at one end, a stop carried by the base and overlapping the said bevel, a lever pivoted to the base, and a die carried by the lever to coöperate with the said bevel.

3. In a saw set, a base embodying a channel, an anvil slidable in the channel, and having a bevel at one end, a stop secured on the respective end of the channel and overlapping the bevel, a lever fulcrumed at the said end of the channel, and a die carried by the lever to coöperate with the said bevel.

4. In a saw set, a base embodying a channel, a reversible anvil slidable in the channel having upper bevels at its ends, jam bolts threaded through the ends of the channel and engaging the ends of the anvil, a stop secured on one end of the channel and overlapping the respective bevel, a lever fulcrumed to the said end of the channel, and a die carried by the lever to coöperate with the respective bevel.

5. In a saw set, a base, a longitudinally adjustable anvil having a bevel at one end and mounted on the base, a stop carried by the base, coöperating with the said bevel, a member carried by the base above the anvil, and a die slidably carried by the said member to move to and from the said bevel.

In testimony that I claim the foregoing as my own, I have hereto affixed my signature in the presence of two witnesses.

WILLIAM H. SWAINSTON.

Witnesses:
A. L. ADAMS,
J. B. ABBEY.

Copies of this patent may be obtained for five cents each, by addressing the "Commissioner of Patents, Washington, D. C."